United States Patent [19]

Ballnus

[11] Patent Number: 5,242,592
[45] Date of Patent: Sep. 7, 1993

[54] PROCESS FOR BIOLOGICAL WASTE WATER TREATMENT

[75] Inventor: Wilhelm Ballnus, Burgwedel, Fed. Rep. of Germany

[73] Assignee: Schreiber Corporation, Inc., Trussville, Ala.

[21] Appl. No.: 959,593

[22] Filed: Oct. 13, 1992

[30] Foreign Application Priority Data

Oct. 12, 1991 [DE] Fed. Rep. of Germany ....... 4133805

[51] Int. Cl.$^5$ .............................................. C02F 3/30
[52] U.S. Cl. .................... 210/605; 210/610; 210/614; 210/630; 210/906
[58] Field of Search ............... 210/605, 610, 614, 626, 210/630, 631, 906, 96.1, 745

[56] References Cited

U.S. PATENT DOCUMENTS

| | | | |
|---|---|---|---|
| 3,342,727 | 9/1967 | Bringle | 210/614 |
| 4,179,366 | 12/1979 | Kaelin | 210/614 |
| 4,333,838 | 6/1982 | Ballnus | 210/745 |
| 4,437,992 | 3/1984 | Saito et al. | 210/614 |
| 4,650,585 | 3/1987 | Hong et al. | 210/605 |
| 4,859,341 | 8/1989 | Schreiber | 210/614 |
| 5,076,928 | 12/1991 | Ballnus | 210/605 |

*Primary Examiner*—Thomas Wyse
*Attorney, Agent, or Firm*—Bell, Seltzer, Park & Gibson

[57] ABSTRACT

Activated sludge process for biological waste water treatment comprises controlling the supply of oxygen to a single tank reactor in response to the phosphate concentration in the anaerobic phase independent of turbidity. The oxic phase is initiated if the maximum turbidity set point is exceeded in the usual manner. However, if the phosphate concentration exceeds its maximum set point before the turbidity reaches a maximum, then the oxic phase is initiated to end phosphate release. Acetic acid can be added to increase phosphate elimination at the end of the anaerobic phase, prior to switching on the supply of oxygen.

20 Claims, 1 Drawing Sheet

5,242,592

PROCESS FOR BIOLOGICAL WASTE WATER TREATMENT

FIELD OF THE INVENTION

The invention claimed herein relates to the activated sludge process for biological waste water treatment.

BACKGROUND OF THE INVENTION

The activated sludge process is a biological process for the treatment of waste water. Advanced processes comprise a sequence of oxic, anoxic and anaerobic process phases in mixed liquor suspended solids that correspond to metabolic processes of living organisms. The process phases can be controlled by controlling the oxygen available in the waste water.

Dissolved oxygen is present in the oxic phase. Carbonaceous compounds are oxidized. Ammonium is oxidized to nitrates and nitrides. The organisms take up phosphates from the waste water for storage in an energy rich form as polyphosphates.

The anoxic phase is characterized by the absence of dissolved oxygen. The organisms use chemically bound oxygen in the form of nitrates and nitrides for respiration. Nitrates and nitrides are converted to nitrogen and carbonaceous compounds are oxidized.

In the anaerobic phase, no dissolved oxygen is present and the organisms have used the available chemically bound oxygen. The organisms metabolize the previously stored energy rich form of phosphate and release phosphate back into the waste water as orthophosphate.

Phosphates are removed from waste water by this process because more orthophosphate is taken up by the organisms in the oxic phase and converted to polyphosphate than is released in the anaerobic phase. The process is cyclic so the greater the release of orthophosphate in the anaerobic phase, the greater the orthophosphate uptake in the oxic phase. Therefore, removal of phosphates from waste water can be increased by increasing the amount of phosphate released during the anaerobic phase.

The process disclosed in U.S. Pat. No. 5,076,928 is an advanced waste water treatment process in which oxic, anoxic, and anaerobic process phases are controlled in a single activated sludge tank. The process phases are controlled in response to the measured turbidity of a clarified water sample of mixed liquor suspended solids. Aeration is switched on at a maximum turbidity set point to initiate the oxic phase and switched off at a minimum turbidity set point to initiate an anoxic phase that is followed by the anaerobic phase. Aeration is switched back on to initiate the oxic phase when the turbidity increases again to its maximum set point.

The process described above provides an undisturbed anaerobic process phase for biological phosphate elimination. The anaerobic process phase provides a high phosphate release to achieve an intensive phosphate uptake in the subsequent oxic phase. Metallic precipitants can be added as an adjunctive chemical treatment for greater phosphate removal.

However, operation of activated sludge treatment facilities using advanced waste water treatment as described above has not proved altogether satisfactory. Consumption of metallic precipitants becomes significant when phosphate release in the anaerobic phase is too great. Also, phosphate concentrations in the effluent of the final clarifier of the waste water treatment plant can increase.

Accordingly, it is an object of the invention claimed herein to create a process for biological waste water treatment that avoids high phosphate concentrations in the effluent of the waste water treatment plant and, at the same time, reduces the consumption of metallic precipitants substantially to zero.

SUMMARY OF THE INVENTION

The process of the invention claimed herein provides for elimination of phosphates from the effluent of the final clarifier of a waste water treatment facility without use of metallic precipitation agents. The process of the invention claimed herein uses in addition to turbidity set points an upper set point for the phosphate concentration of the mixed liquor suspended solids.

If the phosphate concentration exceeds the set phosphate limit, then the aeration is switched on independent of the turbidity of the waste water. The anaerobic phase, and phosphate release into the waste water, ends before maximum turbidity is reached. Phosphate release can be stopped by turning on the aeration at any level of phosphate concentration before the maximum turbidity set point is reached. Accordingly, the process can be controlled with reference to a minimum turbidity set point and a maximum set point corresponding to either turbidity or phosphate concentration.

In a more specific embodiment, the turbidity and phosphate set points can also be used for the controlled addition of soluble organic compounds, such as acetic acid, for increased nitrate and phosphate elimination.

DETAILED DESCRIPTION OF THE PREFERRED EMBODIMENTS

Figure 1:
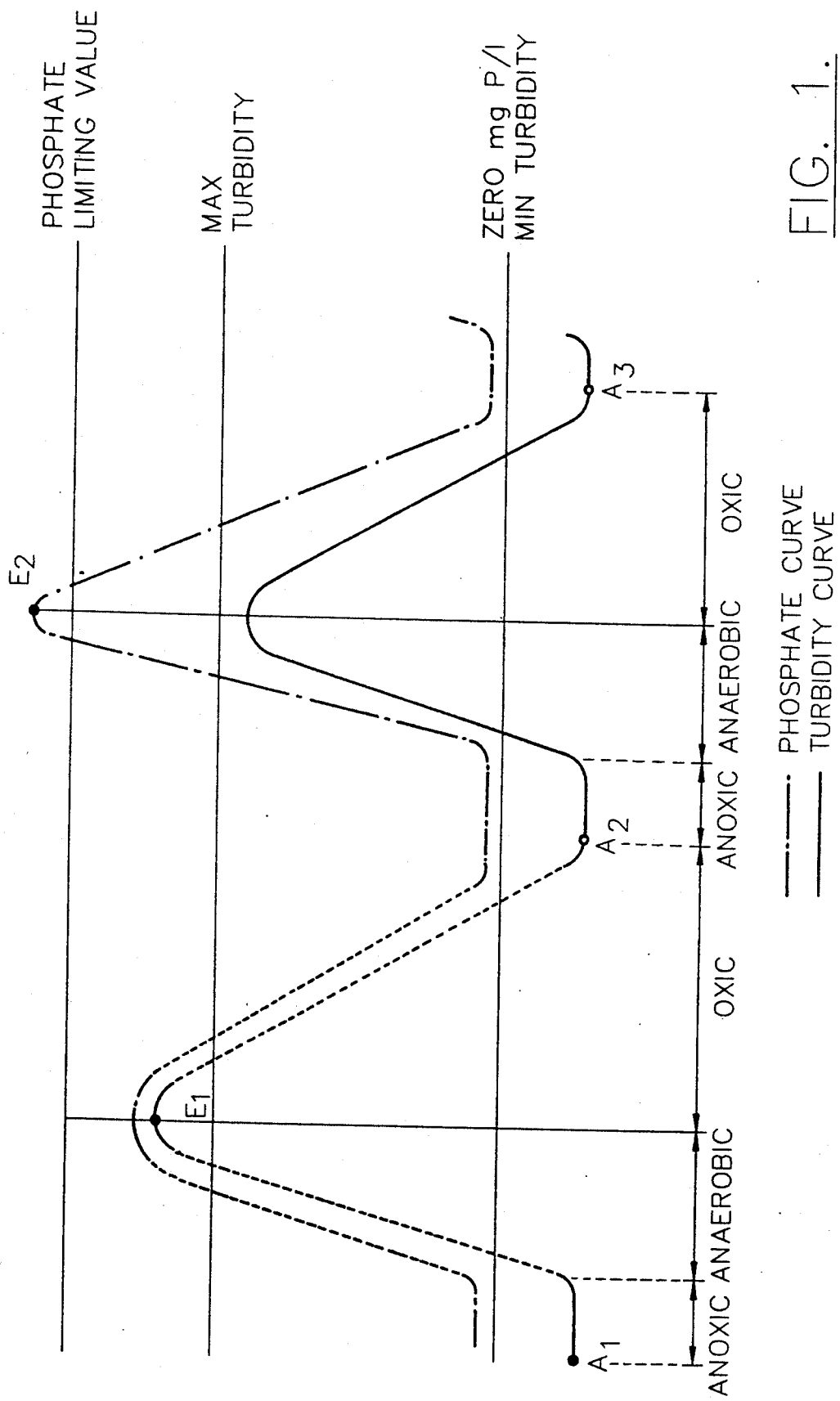
FIG. 1 is a plot showing progression of turbidity values in parts per million and phosphate concentrations ($-PO_4$) in milligrams per liter over time in accordance with the invention claimed herein.

FIG. 1 shows turbidity values and phosphate concentrations as functions of time, controlled in response to set points correlated with minimum and maximum turbidity and maximum phosphate concentration. Turbidity typically is recorded in parts per million and phosphate concentration ($-PO_4$) in milligrams per liter of waste water. The points where aeration, typically by means of blowers, is switched off are designated as $A_1$, $A_2$, $A_3$, and so on. The points where the aeration is switched on are designated as $E_1$, $E_2$, and so on.

Respiration of nitrate oxygen and the elimination of nitrates, called denitrification, starts after aeration is switched off at point A and dissolved oxygen has been consumed. The turbidity is below its minimum set point and the activated sludge process is in its anoxic phase. The phosphate concentration is low. The anaerobic phase with increasing turbidity and release of phosphates starts after complete respiration of nitrate oxygen.

Aeration is switched on at point $E_1$ after the upper turbidity set point maximum is exceeded. The phosphate concentration has remained below the maximum set point value. The oxic phase starts at this point. Carbonaceous compounds are decomposed. Ammonia is oxidized to nitrates. The organisms take up phosphates. The turbidity decreases at the same time, as shown by the plot in FIG. 1. The turbidity curve declines from the maximum set point to the minimum and the phosphate concentration declines. Aeration is switched off again at $A_2$ to initiate an anoxic phase as soon as the turbidity has decreased beyond the minimum set point.

However, in the subsequent anaerobic phase after $A_2$, phosphate release by the organisms causes the phosphate concentration to exceed its maximum limiting value before the turbidity has reached its upper value. When the phosphate limiting value, or set point, is exceeded, as at $E_2$, the aeration is switched on, ending phosphate release and the anaerobic phase independent of turbidity. Continued phosphate release, with inevitable increase in phosphate concentration in the activated sludge, is avoided.

It should be understood that if the phosphate limiting value is not reached, then the supply of oxygen to the waste water is controlled in response to minimum and maximum turbidity values. On the other hand, where the phosphate limiting value is exceeded, then the supply of oxygen to the waste water is controlled in response to minimum turbidity and maximum phosphate concentration.

To further increase phosphate elimination, an appropriate water soluble organic compound such as a fatty acid or its corresponding salt can be added to the activated sludge tank. Acetic acid is one such example. The dosing phase occurs at the end of the anaerobic process phase. The dosing starts as soon as the maximum turbidity set point or maximum phosphate set point is exceeded and stops when the oxygen supply is switched on, as at $E_1$ and $E_2$, respectively. Thus, the water soluble organic compound is always added when either turbidity or phosphate concentration has exceeded its corresponding set point, and before the aeration is switched on.

The invention has been described with respect to particular preferred embodiments. However, variations can be made within the scope of the invention as described in the foregoing specification and as defined in the appended claims.

THAT WHICH IS CLAIMED IS:

1. An activated sludge process for biological waste water treatment wherein oxic, anoxic, and anaerobic process phases are controlled for the treatment of the waste water, the process comprising:
   a) establishing maximum and minimum turbidity values for the waste water;
   b) monitoring the turbidity of the waste water;
   c) supplying oxygen containing gas to the waste water in response to the monitored turbidity if the turbidity exceeds the maximum value established in step a);
   d) stopping the supply of oxygen containing gas to the waste water if the turbidity has fallen below the minimum turbidity value established in step a);
   e) establishing a maximum value for the concentration of phosphates in the waste water;
   f) monitoring the concentration of phosphates in the waste water; and
   g) supplying oxygen containing gas to the waste water if the phosphate concentration has exceeded the maximum value established in step e) independent of the turbidity value.

2. The process of claim 1 wherein the oxygen containing gas is air and is supplied to the waste water by aerating the waste water and wherein aeration is switched on after the maximum phosphate concentration is exceeded and switched off after the minimum turbidity is exceeded.

3. The process of claim 1 wherein turbidity and phosphate concentration are monitored by monitoring a clarified water sample of mixed liquor suspended solids.

4. The process of claim 3 wherein the clarified water sample of mixed liquor suspended solids is taken from an activated sludge tank.

5. The process of claim 1 wherein turbidity and phosphate concentration are monitored in a bypass to an activated sludge tank.

6. The process of claim 1 further comprising the step of dosing the waste water with a water soluble organic compound depending on whether either of the maximum phosphate concentration or maximum turbidity value is exceeded.

7. The process of claim 6 wherein the water soluble organic compounds comprise fatty acids or their corresponding salts.

8. The process of claim 6 wherein the water soluble organic compounds are added to the waste water prior to aerating the waste water.

9. The process of claim 6 wherein the water soluble organic compound is acetic acid.

10. An activated sludge process for biological waste water treatment wherein oxic, anoxic, and anaerobic process phases are controlled in an activated sludge tank for the treatment of the waste water, the process comprising:
    a) supplying waste water to an activated sludge tank to create mixed liquor suspended solids;
    b) establishing maximum and minimum turbidity values for the waste water;
    c) monitoring the turbidity of a clarified water sample of the mixed liquor suspended solids taken in a bypass to the activated sludge tank;
    d) aerating the waste water to establish an oxic phase in response to the monitored turbidity if the turbidity exceeds the maximum value established in step b);
    e) stopping aerating the waste water to initiate an anoxic phase followed by an anaerobic phase if the turbidity has fallen below the minimum turbidity value established in step b);
    f) establishing a maximum value for the concentration of phosphates in the waste water;
    g) monitoring the concentration of phosphates in a clarified water sample of the mixed liquor suspended solids taken in a bypass to the activated sludge tank; and
    h) aerating the waste water if the phosphate concentration has exceeded the maximum value established in step f) to end release of phosphates into the waste water and establish an oxic phase independent of the monitored turbidity value, whereby excessive phosphate release in the anaerobic phase is avoided.

11. The process of claim 10 further comprising the step of dosing the waste water with a water soluble organic compound depending on whether either of the maximum phosphate concentration or maximum turbidity value is exceeded.

12. The process of claim 11 wherein the water soluble organic compounds comprise fatty acids or their corresponding salts.

13. The process of claim 11 wherein the water soluble organic compounds are added to the waste water prior to aerating the waste water.

14. The process of claim 11 wherein the water soluble organic compounds comprise acetic acid.

15. An activated sludge process for biological waste water treatment wherein oxic, anoxic, and anaerobic process phases are controlled for the treatment of the waste water, the process comprising:
   a) establishing maximum and minimum turbidity values for the waste water;
   b) monitoring the turbidity of the waste water;
   c) dosing the waste water with a fatty acid or its corresponding salt in response to the monitored turbidity if the turbidity exceeds the maximum value established in step a);
   d) supplying oxygen containing gas to the waste water after step c) in response to the monitored turbidity if the turbidity exceeds the maximum value established in step a);
   e) stopping the supply of oxygen containing gas to the waste water if the turbidity has fallen below the minimum turbidity value established in step a);
   f) establishing a maximum value for the concentration of phosphates in the waste water;
   g) monitoring the concentration of phosphates in the waste water;
   h) dosing the waste water with a fatty acid or its corresponding salt in response to the monitored phosphate concentration if the phosphate concentration exceeds the maximum value established in step f); and
   i) supplying oxygen containing gas to the waste water after step h) if the phosphate concentration has exceeded the maximum value established in step f), independent of the turbidity value.

16. The process of claim 15 wherein oxygen containing gas is air and is supplied to the waste water by aerating the waste water and wherein aeration is switched on after the maximum phosphate concentration is exceeded and switched off after the minimum turbidity is exceeded.

17. The process of claim 15 wherein turbidity and phosphate concentration are monitored by monitoring a clarified water sample of mixed liquor suspended solids.

18. The process of claim 17 wherein the clarified water sample of mixed liquor suspended solids is taken from an activated sludge tank.

19. The process of claim 15 wherein turbidity and phosphate concentration are monitored in a bypass to an activated sludge tank.

20. The process of claim 15 wherein the fatty acid is acetic acid.

* * * * *